US00RE44316E

(19) United States
(12) Reissued Patent
Parantainen et al.

(10) Patent Number: US RE44,316 E
(45) Date of Reissued Patent: Jun. 25, 2013

(54) INFORMING NETWORK ABOUT AMOUNT OF DATA TO BE TRANSFERRED

(75) Inventors: Janne Parantainen, Helsinki (FI); Guillaume Sebire, Helsinki (FI)

(73) Assignee: Intellectual Ventures I LLC, Wilmington, DE (US)

(21) Appl. No.: 12/774,916

(22) Filed: May 6, 2010

Related U.S. Patent Documents

Reissue of:
(64) Patent No.: 7,369,508
Issued: May 6, 2008
Appl. No.: 10/450,141
PCT Filed: Oct. 17, 2001
PCT No.: PCT/FI01/00900
§ 371 (c)(1),
(2), (4) Date: Aug. 25, 2003
PCT Pub. No.: WO03/034757
PCT Pub. Date: Apr. 24, 2003

(51) Int. Cl.
*G01R 31/08* (2006.01)

(52) U.S. Cl.
USPC ..... 370/230.1; 370/231; 370/329; 370/252; 370/338; 370/428

(58) Field of Classification Search
USPC ..... 370/230, 230.1, 231, 252, 328, 329
See application file for complete search history.

(56) References Cited

U.S. PATENT DOCUMENTS 5,598,417 A 1/1997 Crisler et al.
6,115,362 A 9/2000 Bosa et al.
6,718,179 B1 4/2004 Forssell et al.
6,901,060 B1 * 5/2005 Lintulampi ..... 370/329
7,054,268 B1 5/2006 Parantainen et al.

FOREIGN PATENT DOCUMENTS

WO WO 00/02401 1/2000
WO WO-00/02401 A2 1/2000
WO WO-01/41472 A1 6/2001

OTHER PUBLICATIONS

"GPRS Radio Interface-Radio Link control Details in GPRS," Advanced Topics in Telecommunications Report, Apr. 7, 2000.
3GPP TSG Geran Adhoc. "RLC and MAC Multiplexing for Geran," Oct. 9-13, 2000.
Examination Report for EP Application 01978488.3, dated Oct. 10, 2006.
International Search Report for PCT/FI/01/00900, mailed Jun. 6, 2002.
3GPP TSG Geran Adhoc, "*RLC and MAC Multiplexing for GERAN*", Oct. 9-13, 2000.

* cited by examiner

*Primary Examiner* — Jung Park

(57) ABSTRACT

When uplink signalling radio bearers steal capacity from a user bearer, at least the amount of data waiting for transmission on a TBF established for the user bearer should be informed to the network. This can be done by using separate countdown values for each radio bearer, using a first countdown value for the bearer the TBF was established for and a second countdown value which indicates the total amount of data on stealing bearers, or by calculating a common countdown value indicating the total amount of data on all bearers using the TBF.

34 Claims, 2 Drawing Sheets

INFORMING NETWORK ABOUT AMOUNT OF DATA TO BE TRANSFERRED

Matter enclosed in heavy brackets [ ] appears in the original patent but forms no part of this reissue specification; matter printed in italics indicates the additions made by reissue.

*CROSS-REFERENCE TO RELATED APPLICATIONS*

*The present application is a reissue of U.S. patent application Ser. No. 10/450,141 (now U.S. Pat. No. 7,369,508), filed Aug. 25, 2003, which is a national stage entry of International Pat. App. No. PCT/FI01/00900, filed Oct. 17, 2001.*

FIELD OF THE INVENTION

The present invention relates to informing a network about the amount of data to be transferred on an uplink layer 2 link used for transferring signalling data and user data, and more particularly to informing a network on the amount of data to be transferred on an uplink layer 2 link established for a user plane radio bearer, the layer 2 link being also used for sending data blocks of signalling radio bearers in a mobile communication system.

BACKGROUND OF THE INVENTION

The mobile communication system generally refers to any telecommunication system, which enables wireless communication when a user is located within the service area of the system. Examples of such systems are cellular mobile communication systems, such as the GSM (Global System for Mobile communications), or corresponding systems, such as the PCS (Personal Communication System) or the DCS 1800 (Digital Cellular System for 1800 MHz), third-generation mobile systems, such as the UMTS (Universal Mobile Communication System) and systems based on the above-mentioned systems, such as GSM 2+ systems and the future $4^{th}$ generation systems. One typical example of a mobile communication system is the public land mobile network PLMN.

While the standardization of the UMTS is maturing, the GSM 2+ systems are also evolving towards the UMTS. This means that features of the UMTS, which were not originally planned to be embedded in the GSM 2+, are added to GSM 2+ systems or services, such as GPRS (General Packet Radio Service) or GERAN (GSM/EDGE (Enhanced Data rates for Global Evolution) Radio Access Network). One example of such an added feature is having several signalling radio bearers for one mobile station between the mobile station and the radio access network. In the GERAN, release 5 lu, it has been agreed that the mobile station will have 5 uplink signalling radio bearers, one of which is transmitted over a CCCH (Common Control Channel) or a PCCCH (Packet Common Control Channel). The data of the other four signalling radio bearers may be multiplexed into a layer 2 link established for a user data bearer. The layer 2 link is called a Temporary Block Flow TBF in the GPRS and the GERAN. The layer 2 link, hereinafter called a TBF, is a carrier (i.e. allocated radio resource) that supports the unidirectional transfer of packet data units. The TBF is temporary and it is maintained usually only for the duration of the data transfer.

Besides layer 2, also called a data link layer L2, the protocol architecture of the air interface of a GERAN lu, called a Um-interface, comprises a physical layer L1 and a network layer L3. The lu means that mobile stations are connected to a radio access network GERAN with lu interfaces towards the core network providing the data transfer. The data link layer L2 of the GERAN lu comprises a radio link control RLC sublayer and a medium access control MAC sublayer, which are common for a user plane (i.e. for user data) and for a signalling plane (i.e. for signalling data). The layers above the RLC are a PDCP (Packet Data Convergence Protocol) for the user plane and an RRC (Radio Resource Control) for the signalling plane. Each radio bearer has an RLC instance transmitting the radio bearer data for peer-to-peer information change. The RLC instance transmits information by means of data blocks called packet data units over the air interface on the TBF using e.g. ARQ procedures. Each data block originates from a certain RLC instance. At a transmitting site, the RLC instance forms RLC packet data units by segmenting the upper layer data into data blocks, to which layer 2 control information is added. At a receiving site the RLC instance reassembles the RLC data blocks into upper layer data.

In the GPRS, there is a procedure called a countdown procedure, with which the mobile station informs the network side about how many data blocks are to be sent on the TBF. The mobile station sends a countdown value in each uplink data block to indicate the current number of remaining data blocks for the uplink TBF. The network schedules resources for this TBF on the basis of the QoS (quality of service) parameters of the user data bearer and the amount of data to be sent on the user data bearer, for example. The QoS parameters indicate the properties that the user data bearer needs, such as delay requirements.

One of the problems associated with the above arrangement is that when one or more radio bearer(s) (and hence RLC instances) can be stealing capacity from a user radio bearer A, i.e. are multiplexed to a TBF established for the user radio bearer A, there is no mechanism to take into account the amount of data of other bearers transmitting data blocks on the TBF of the user radio bearer A. Therefore the network does not know how much resources and how frequently it should allocate for the TBF.

BRIEF DESCRIPTION OF THE INVENTION

An object of the present invention is thus to provide a method and an apparatus for implementing the method so as to overcome the above problem. The object of the invention is achieved by a method, a network node and a mobile station, which are characterized by what is stated in the independent claims. The preferred embodiments of the invention are disclosed in the dependent claims.

The invention is based on realizing the problem and solving it by modifying the way to define a countdown value for a TBF such that all the data blocks multiplexed to the TBF are also taken into account. In an embodiment of the invention, one TBF will have as many countdown values as there are radio bearers (and hence RLC instances) using the TBF. In another embodiment of the invention, there are two countdown values, i.e. one for the radio bearer the TBF was established for and the other for all other radio bearers using the TBF. Yet in another embodiment of the invention, one countdown value is calculated from data blocks of all radio bearers using the TBF.

An advantage of the invention is that the network will be provided with enough information for resource allocation.

Another advantage of the invention is that when there is still something waiting for to be sent on a TBF, the release of the TBF can be avoided.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The present invention can be applied to any communication system providing data transfer over the air interface. Such systems include the above-mentioned systems, for example. In the following the invention will be described by using a GERAN lu system as an example, without restricting the invention thereto.

Figure 1:
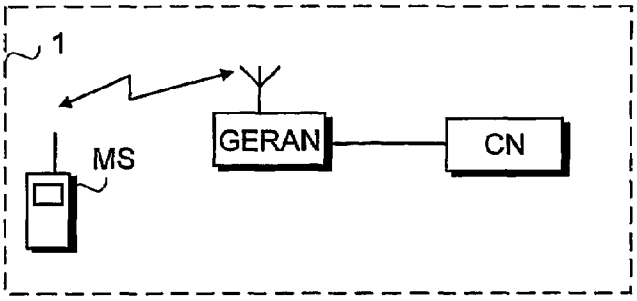
FIG. 1 illustrates basic parts of a communication system.

FIG. 1 shows a very simplified network architecture illustrating only basic parts of the communication system 1. It is obvious to a person skilled in the art that the system 1 comprises network nodes, functions and structures, which need not be described in greater detail herein.

A mobile station MS comprises an actual terminal and a detachably connected identification card SIM, also called a subscriber identity module. The mobile station of the invention, and more precisely the RLC/MAC entity in the mobile station, calculates countdown value(s) at least according to one of the preferred embodiments of the invention described later. In this context, the mobile station generally means the entity formed by the subscriber identity module and the actual terminal. The SIM is a smart card, which comprises subscriber identity, performs authentication algorithms and stores authentication and cipher keys and subscription information necessary for the user equipment. The actual terminal of the invention can be any equipment capable of communicating in a mobile communication system and supporting multicarrier access. The terminal can thus be a simple terminal intended only for speech, or it can be a terminal for various services, operating as a service platform and supporting the loading and carrying out of different service-related functions. The terminal can also be a combination of various devices, for example a multimedia computer with a Nokia card phone connected to it to provide a mobile connection.

In the example of FIG. 1, the system 1 comprises a core network CN and a radio access network GERAN. The GERAN is formed of a group of radio network subsystems (not shown in FIG. 1), such as base station sub-systems of GSM, which are connected to the core network CN via a so-called lu-interface 2. The GERAN may be a GSM/EDGE Radio Access Network and the CN may be a GSM/UMTS core network. RLC/MAC entities in the network side locate typically in network nodes of the GERAN, but they can also locate in a serving network node of the CN, such as SGSN (Serving GPRS Support Node). The RLC/MAC entities in the network may be modified to interpret the countdown value field of data blocks as disclosed later.

In addition to prior art means, the system implementing the functions of the present invention, the mobile stations and the network nodes of this system comprise means for performing at least one of the modified countdown value definitions disclosed below. More precisely, the mobile station comprises a calculator for implementing at least one of the ways described below to calculate countdown values, and the network nodes may comprise means for interpreting different countdown values and means for maintaining information on countdown values for each TBF. The current network nodes and mobile stations comprise processors and memory, which can be utilized in the functions according to the invention. All changes necessary for implementing the invention can be made by added or updated software routines, and/or by routines included in application-specific integrated circuits (ASIC) and/or programmable circuits, such as EPLD, FPGA.

Figure 2:
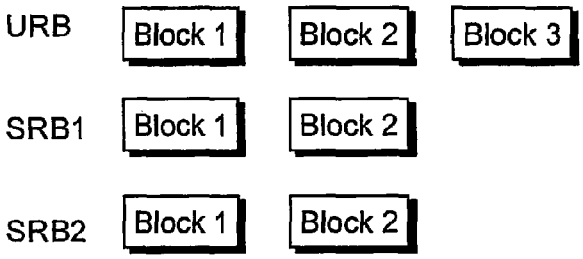
FIG. 2 illustrates data blocks of different radio bearers sharing the same TBF.

FIG. 2 shows an example of different radio bearers having data blocks waiting for scheduling and transmittance on one TBF. FIG. 2 is used below to elucidate the three different ways to calculate countdown values according to the invention.

In the following, it is assumed that the payload type of the RLC/MAC data block indicates whether the data block belongs to the radio bearer the TBF was established for or to one of the radio bearers multiplexed to the TBF. In other words, to inform the network side the mobile station uses in the first, the second and the third preferred embodiment of the invention the payload type to distinguish the multiplexed data from the original data. It is obvious to one skilled in the art that also some other indicator than the payload type may be used for the same purpose. In other words, data from different RLC instances are distinguished preferably on the basis of some field (or fields) in the RLC/MAC header. If there are several stealing radio bearers, they are distinguished from one another by their radio bearer identity included in the RLC/MAC block itself. In the following, it is also assumed that the MS schedules different data blocks and the network only allocates capacity for the TBF. Usually the signalling data has a higher priority than the user data.

In the following, a 'multiplexed radio bearer' means a radio bearer for which no own TBF is established, i.e. it means the same as a stealing radio bearer.

Abbreviations and Assumptions Used in the Formulas:

TBC=total number of RLC data blocks that will be transmitted in the active period of the RLC instance BSN'=absolute BSN (Block Sequence Number) of the RLC data block, with a range from 0 to (TBC−1), NTS=number of timeslots assigned to the uplink TBF in the assignment message, with a range from 1 to 8, $BS_{13}$ CV_MAX is a parameter broadcast in the system information and represents the round-trip delay between peer RLC entities, function round( ) rounds upwards to the nearest integer, division operation is a non-integer and results in zero only when the dividend is zero, there are altogether n RLC instances.

First Way to Define a Countdown Value

In the first preferred embodiment of the invention, a separate CV is preferably calculated for each RLC instance (RLC instance i, i=1 . . . n) using a TBF as if there were only one RLC instance using the TBF, i.e. using the following prior art formula:

$$\text{Let integer } x_i = \text{round}\left(\frac{TBC_i - BSN'_i - 1}{NTS}\right)$$

$$\text{Then, } CV_i = \begin{cases} x_i, & \text{if } x_i \le BS_CV_MAX \\ 15, & \text{otherwise} \end{cases}$$

With separate CVs the mobile station calculates the countdown value and adds it to the data block, as if the RLC instance the data block belongs to were the only one using the TBF. All the data blocks will have the same TBF identifier called TFI so that the network can recognize over which TBF the data block was sent.

As stated earlier, the payload type is used in this example to distuinguish data from different RLC instances. In the example of FIG. 2, the countdown value CV for the User Radio Bearer URB would be 3 and the pay-load type "00" indicating that this radio bearer is the one the TBF was established for; the countdown value CV for the Signalling Radio Bearer SRB1 would be 2 and the payload type "11" to indicate that this radio bearer is multiplexed to another radio bearer; and the countdown value CV for the Signalling Radio Bearer SRB2 would be in this example also 2 and the payload type "11".

Figure 3:
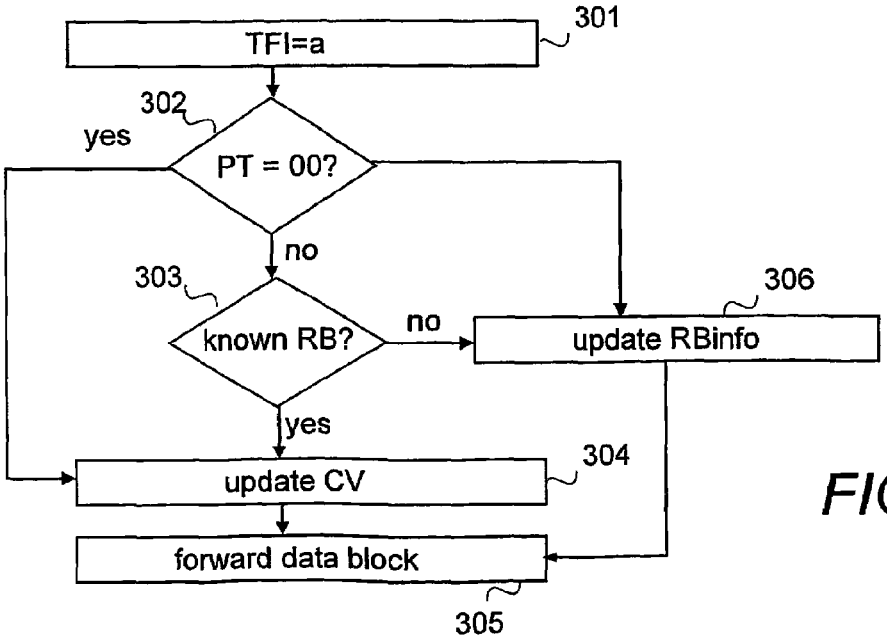
FIG. 3 illustrates the functionality of an RLC/MAC entity in the network side in a first preferred embodiment of the invention.

When separate CVs are used, the network side preferably maintains information on how many RLC instances (that is radio bearers) are using the TBF, and the TBF may be released preferably only in response to the last RLC instance informing that it has nothing to send (i.e. countdown value CV=0). The functionality of an RLC/MAC entity in the network side in the first preferred embodiment of the invention is illustrated in more detail in FIG. 3. In the first preferred embodiment of the invention, it is assumed that the RLC/MAC entity maintains information on each separate countdown value and associates them with their radio bearers RBs. In FIG. 3, it is assumed for the sake of clarity that the data blocks sent on TBF 'a' are either user data blocks or multiplexed blocks, i.e. the payload type PT is either '00' or '11'. It is obvious for one skilled in the art how the RLC/MAC entity handles RLC/MAC blocks with other payload types.

FIG. 3 starts when a data block with TFI=a is received on TBF 'a' in step 301. It is checked in step 302 whether the payload type is '00', i.e. whether this data block belongs to the user radio bearer the TBF was established for. If it does not, the payload type is '11' and it is checked in step 303, whether this data block belongs to a known radio bearer RB, i.e. a radio bearer for which blocks have been sent and received on the TBF. In other words, it is checked whether the RLC/MAC entity already has a countdown value for this RB. The header of the data block contains in one field the radio bearer identity. If there already exists information on that RB, the countdown value CV and possible some other information is updated in step 304 and the data block is forwarded in step 305.

If the payload type was '00' (step 302), the countdown value CV and possible some other information of the user radio bearer the TBF was established for is updated in step 304 and the data block is forwarded in step 305.

If the RB was not known (step 303), the information on radio bearers using this TBF, i.e. RBinfo, is updated in step 304. In other words, a new radio bearer is added to the RBinfo and at least its countdown value is associated with it. In the first preferred embodiment of the invention the RBinfo comprises information on all the radio bearers using the TBF. In another embodiment of the invention, the RBinfo comprises information only on multiplexed radio bearers.

The network uses the RBinfo to modify the uplink resource allocation of the TBF.

Although not shown in FIG. 3, in the first preferred embodiment of the invention the RBinfo is updated in response to countdown value zero by removing the radio bearer the countdown value belongs to from the RBinfo regardless of the payload type of the radio bearer. Thus, when the need to release the TBF exists, it is easy to find the TBFs, whose RBinfo is empty, i.e. those TBFs that may be released. In another embodiment of the invention, in which an RB is not removed from the RBinfo in response to countdown value zero, the RLC/MAC entity has to check countdown values in order to find those TBFs that may be released.

Separate CVs provide the network with good knowledge of the resources required by each separate radio bearer using the TBF, and thus the network may schedule the uplink resources (i.e. modify the uplink resource allocation) by taking into account not only the amount of data to be transmitted but also the different RLC instances and their Quality of Service (QoS) class. For example, the network may allocate more resources for the TBF, if needed.

Second Way to Define a Countdown Value

In the second preferred embodiment of the invention, two different kinds of countdown values are used: a first countdown value CV is calculated for the user data of the user radio bearer the TBF was established for, and a second countdown value CV is calculated for other radio bearers using the TBF.

The second countdown value, i.e. SRB_CV, can be calculated by using the following formula based on the prior art formula:

$$\text{Let integer } x = \text{round}\left(\frac{\sum_{i=1}^{n-1} TBC_i - BSN'_i - 1}{NTS}\right)$$

$$\text{Then, } SRB_CV = \begin{cases} x, & \text{if } x \le BS_CV_MAX \\ 15, & \text{otherwise} \end{cases}$$

The first countdown value, URB_CV, which is the CV of the user radio bearer (URB), for which the TBF is established for, is calculated by using the following prior art formula:

$$\text{Let integer } x_{URB} = \text{round}\left(\frac{TBC_{URB} - BSN'_{URB} - 1}{NTS}\right)$$

$$\text{Then, } URB_CV = \begin{cases} x_{URB}, & \text{if } x_{URB} \le BS_CV_MAX \\ 15, & \text{otherwise} \end{cases}$$

In the second preferred embodiment of the invention, the mobile station calculates the second countdown value and adds it to the data block belonging either to any signalling radio bearer using this TBF or to some user radio bearer using the TBF not established for it. In other words, if the data block belongs to a multiplexed (stealing) radio bearer, the second countdown value is added to it. If the data block to be sent belongs to the user radio bearer the TBF was established for, the mobile station calculates the URB_CV and adds it to the data block. In other words, the mobile station checks, before calculating the countdown value, to which radio bearer the data block belongs to, and on the basis of the radio bearer selects the used formula. All the data blocks will still have the same TBF identifier called TFI, so that the network can recognize over which TBF the data block was sent.

According to the second preferred embodiment of the invention, the countdown value URB_CV for the User Radio Bearer URB in the example of FIG. 2 would be 3 and the payload type "00" indicating that this radio bearer is the one the TBF was established for; the second countdown value SRB_CV for the Signalling Radio Bearers SRB1 and SRB2 would be 4 and the payload type "11" to indicate that this countdown value indicates the amount of data to be transmitted on radio bearers multiplexed to the TBF. Thus the second countdown value reflects the total radio resource needs for these multiplexed radio bearers.

Figure 4:
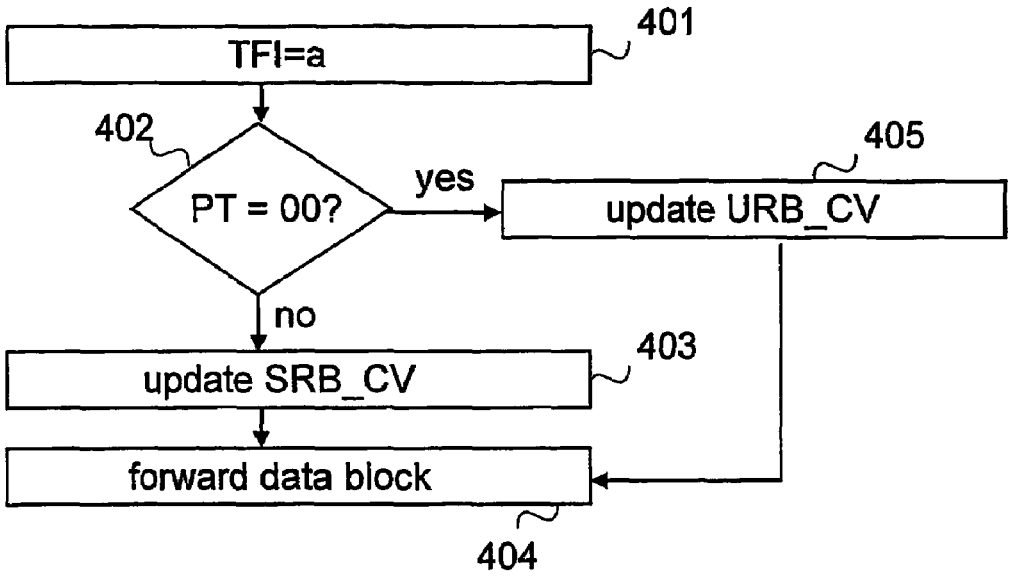
FIG. 4 illustrates the functionality of an RLC/MAC entity in the network side in a second preferred embodiment of the invention.

When two CVs are used, the network side preferably maintains information on both countdown values and only after both have informed that there is nothing to be sent (i.e. countdown value CV=0), the TBF may be released. The functionality of an RLC/MAC entity in the network side in the second preferred embodiment of the invention is illustrated in more detail in FIG. 4. In FIG. 4, it is assumed for the sake of clarity that the data blocks sent on TBF 'a' are either user data blocks or multiplexed blocks, i.e. the payload type PT is either '00' or '11'. It is obvious for one skilled in the art how the RLC/MAC entity handles data blocks with other payload types.

FIG. 4 starts when a data block with TFI=a is received on TBF 'a' in step 401. It is checked in step 402 whether the payload type is '00', i.e. whether this data block belongs to the user radio bearer the TBF was established for. If it does not, the payload type is '11' and the second countdown value SRB_CV is updated in step 403 and the data block is forwarded in step 404. In step 403, some other information may also be updated or stored.

If the payload type is '00' (step 402), the first countdown value URB_CV is updated in step 405 and the data block is forwarded in step 404. In step 405, some other information relating to the user data bearer the TBF was established for may also be updated In one embodiment of the invention where only signalling radio bearers can be multiplexed, the second countdown value indicates the amount of signalling data. In the embodiment, the network may schedule the uplink resources taking into account not only the amount of data to be transmitted but also both the user data RLC instance with its QoS class and signalling data instances with so similar QoSs that for allocation purposes a common QoS can be used for signalling radio bearers.

In another embodiment of the invention, the second countdown value is calculated from data blocks of signalling radio bearers, and a third countdown value corresponding to the second countdown value is calculated from data blocks of user data bearers using the TBF not established for them.

Yet in another embodiment of the invention the second countdown value is calculated from data blocks of signalling radio bearers, and a separate countdown value disclosed in the first preferred embodiment of the invention is calculated for user data bearers.

Third Way to Define a Countdown Value

In the third preferred embodiment of the invention, only one countdown value, called a common countdown value CV, is calculated for all radio bearers using the TBF and included in each RLC data block. The formula to be used is:

$$\text{Let integer } x = \text{round}\left(\frac{\sum_{i=1}^{n} \text{TBC}_i - \text{BSN}'_i - 1}{\text{NTS}}\right)$$

$$\text{Then, Common_CV} = \begin{cases} x, & \text{if } x \le \text{BS_CV_MAX} \\ 15, & \text{otherwise} \end{cases}$$

In the third preferred embodiment of the invention, the mobile station calculates the common countdown value and adds it to the data block regardless of whether it belongs either to the user radio bearer the TBF was established for or to some other radio bearer multiplexed to the TBF.

According to the third preferred embodiment of the invention, the common countdown value for all radio bearers, i.e. the User Radio Bearer URB and Signalling Radio Bearers SRB1 and SRB2, would be 7 in the example of FIG. 2 assuming that the BS_CV_MAX exceeds 7. When using one common countdown value, the network does not have to be informed about whether the countdown value belongs to the radio bearer the TBF was established for or to a radio bearer multiplexed to the TBF. However, the payload type "00" may be used to indicate that this data block belongs to the radio bearer the TBF was established for, and the payload type "11" to indicate that this data block belongs to a radio bearer multiplexed to the TBF.

In the third preferred embodiment of the invention, the network side can be the prior art network side.

Although the invention has been described above by assuming that the countdown value indicates the number of data blocks to be sent, it is obvious for one skilled in the art that the countdown value may indicate something else, which can be used when the amount of data to be transferred is estimated. For example, the actual amount of data can be used.

It is also obvious for one skilled in the art that the formulas disclosed above are only exemplary and disclose only one way of calculating countdown values according to the invention.

It will be obvious for one skilled in the art that as the technology advances the inventive concept can be implemented in various ways. The invention and its embodiments are not limited to the examples described above but may vary within the scope of the claims.

The invention claimed is:

1. A method for informing a network side about an amount of data to be transferred by means of data blocks in a wireless communication system, the method comprising:

allocating, *at a mobile station,* a first wireless uplink bearer for a connection between a mobile station and a network, the first wireless uplink bearer being allocated for user data transfer;

establishing, *at the mobile station,* a first temporary block flow (TBF) for the first wireless uplink bearer for data block transfer;

allocating, *at the mobile station,* a second wireless uplink bearer for a connection between the mobile station and the network, the second wireless uplink bearer being a bearer using the first TBF for data block transfer;

adding to a data block, *at the mobile station,* a countdown value indicating the amount of data waiting for transmission using the first TBF for both the first wireless uplink bearer and the second wireless uplink bearer.

2. The method of claim 1, wherein the first wireless uplink bearer is a user radio bearer and the second wireless uplink bearer is a signalling radio bearer, the method further comprising scheduling a resource allocation of the first TBF at least on the basis of countdown value defined for the different kinds of bearers.

3. The method of claim 1, wherein the countdown value comprises a first countdown value indicating a first amount of data waiting for transmission on the first bearer and a second countdown value indicating a second amount of data waiting for transmission on the second bearer.

4. The method of claim 3, wherein the second countdown value includes data waiting for transmission on a plurality of second bearers.

5. The method of claim 1, wherein the countdown value comprises a sum of a first countdown value and a second countdown value, the first countdown value indicating a first amount of data waiting for transmission on the first bearer, and the second countdown value indicating a second amount of data waiting for transmission on the second bearer.

6. The method of claim 5, wherein the second countdown value includes data waiting for transmission on a plurality of second bearers.

7. A mobile station in a wireless communication system where data is transmitted by means of data blocks on radio bearers, the mobile station comprising:

a communication interface, the communication interface configured to send a data block;

a *non-transitory* computer-readable medium having computer-readable instructions stored therein [which are programmed] to allocate a first radio bearer for a connection between a mobile station and a network; establish a first temporary block flow (TBF) for the first radio bearer; allocate a second bearer for the connection, the second bearer being a bearer using the first TBF for data block transfer; calculate a countdown value, the countdown value indicating an amount of data waiting for transmission on the first radio bearer and the second bearer using the first TBF; add the calculated countdown value to the data block; and a processor, the processor coupled to the communication interface and to the computer-readable medium and configured to execute the instructions.

8. The mobile station of claim 7, wherein the countdown value comprises a first countdown value indicating a first amount of data waiting for transmission on the first bearer and a second countdown value indicating a second amount of data waiting for transmission on the second bearer.

9. The mobile station of claim 8, wherein the second countdown value includes data waiting for transmission on a plurality of second bearers.

10. The mobile station of claim 7, wherein the countdown value comprises a sum of a first countdown value and a second countdown value, the first countdown value indicating a first amount of data waiting for transmission on the first bearer, and the second countdown value indicating a second amount of data waiting for transmission on the second bearer.

11. The mobile station of claim 10, wherein the second countdown value includes data waiting for transmission on a plurality of second bearers.

12. A network node in a wireless communication system where data is transmitted by means of data blocks on radio bearers, the network node comprising:

a communication interface, the communication interface configured to receive a data block;

a *non-transitory* computer-readable medium having computer-readable instructions stored therein [which are programmed] to receive the data block on a first temporary block flow (TBF) established for a first radio bearer and allocated to a second bearer, the data block comprising a countdown value indicating an amount of data waiting for transmission on the first bearer and the second bearer; identify the radio bearer the data block belongs to and maintain information on the countdown value.

13. The network node of claim 12, further comprising instructions programmed to modify a resource allocation of the first TBF at least on the basis of the countdown value of the first TBF.

14. The network node of claim 12, wherein the countdown value comprises a first countdown value indicating a first amount of data waiting for transmission on the first bearer and a second countdown value indicating a second amount of data waiting for transmission on the second bearer.

15. The network node of claim 14, wherein the second countdown value includes data waiting for transmission on a plurality of second bearers.

16. The network node of claim 12, wherein the countdown value comprises a sum of a first countdown value and a second countdown value, the first countdown value indicating a first amount of data waiting for transmission on the first bearer, and the second countdown value indicating a second amount of data waiting for transmission on the second bearer.

17. The network node of claim 16, wherein the second countdown value includes data waiting for transmission on a plurality of second bearers.

*18. A method for a network node, comprising:*

*receiving, at a network node, a data block on a first temporary block flow (TBF) established for a first radio bearer and allocated to a second bearer, the data block comprising a countdown value indicating an amount of data waiting for transmission on the first bearer and the second bearer; and*

*identifying, at the network node, the radio bearer to which the data block belongs and maintaining information on the countdown value.*

*19. The method of claim 18, further comprising modifying a resource allocation of the first TBF at least on the basis of the countdown value of the first TBF.*

*20. The method of claim 18, wherein the countdown value comprises a first countdown value indicating a first amount of data waiting for transmission on the first bearer and a second countdown value indicating a second amount of data waiting for transmission on the second bearer.*

*21. The method of claim 20, wherein the second countdown value includes data waiting for transmission on a plurality of second bearers.*

*22. The method of claim 18, wherein the countdown value comprises a sum of a first countdown value and a second countdown value, the first countdown value indicating a first amount of data waiting for transmission on the first bearer, and the second countdown value indicating a second amount of data waiting for transmission on the second bearer.*

*23. The method of claim 22, wherein the second countdown value includes data waiting for transmission on a plurality of second bearers.*

*24. A non-transitory computer-readable medium having computer-readable instructions stored thereon, which, upon execution by a processor, cause the implementation of a set of operations for a mobile station, the operations comprising:*

*allocating a first radio bearer for a connection between the mobile station and a network;*

*establishing a first temporary block flow (TBF) for the first radio bearer, to transfer data blocks;*

*allocating a second bearer for the connection, the second bearer using the first TBF for data block transfer;*

*calculating a countdown value indicating an amount of data waiting for transmission on the first radio bearer and the second bearer using the TBF; and*

*adding the countdown value to a data block to be transmitted.*

*25. The non-transitory computer-readable medium of claim 24, wherein the countdown value comprises a first countdown value indicating a first amount of data waiting for transmission on the first bearer and a second countdown value indicating a second amount of data waiting for transmission on the second bearer.*

*26. The non-transitory computer-readable medium of claim 25, wherein the second countdown value includes data waiting for transmission on a plurality of second bearers.*

*27. The non-transitory computer-readable medium of claim 24, wherein the countdown value comprises a sum of a first countdown value and a second countdown value, the first countdown value indicating a first amount of data waiting for transmission on the first bearer, and the second countdown value indicating a second amount of data waiting for transmission on the second bearer.*

*28. The non-transitory computer-readable medium of claim 27, wherein the second countdown value includes data waiting for transmission on a plurality of second bearers.*

*29. A non-transitory computer-readable medium having computer-readable instructions stored thereon, which, upon execution by a processor, cause the implementation of operations for a network node of a communication system, the operations comprising:*

*receiving a data block on a first temporary block flow (TBF) established for a first radio bearer and allocated to a second bearer, the data block comprising a countdown value indicating an amount of data waiting for transmission on the first bearer and the second bearer; and*

*identifying the radio bearer to which the data block belongs and maintaining information on the countdown value.*

*30. The non-transitory computer-readable medium of claim 29, wherein the operations further comprise modifying a resource allocation of the first TBF at least on the basis of the countdown value of the first TBF.*

*31. The non-transitory computer-readable medium of claim 29, wherein the countdown value comprises a first countdown value indicating a first amount of data waiting for transmission on the first bearer and a second countdown value indicating a second amount of data waiting for transmission on the second bearer.*

*32. The non-transitory computer-readable medium of claim 31, wherein the second countdown value includes data waiting for transmission on a plurality of second bearers.*

*33. The non-transitory computer-readable medium of claim 29, wherein the countdown value comprises a sum of a first countdown value and a second countdown value, the first countdown value indicating a first amount of data waiting for transmission on the first bearer, and the second countdown value indicating a second amount of data waiting for transmission on the second bearer.*

*34. The non-transitory computer-readable medium of claim 33, wherein the second countdown value includes data waiting for transmission on a plurality of second bearers.*

* * * * *